US008821284B2

(12) United States Patent
Jennings et al.

(10) Patent No.: US 8,821,284 B2
(45) Date of Patent: Sep. 2, 2014

(54) ADAPTER APPARATUS FOR A HANDHELD CONTROLLER

(75) Inventors: Alice Sebastian Minchella Jennings, Los Angeles, CA (US); Christopher K. Dingle, Los Angeles, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 517 days.

(21) Appl. No.: 12/777,160

(22) Filed: May 10, 2010

(65) Prior Publication Data
US 2011/0275437 A1 Nov. 10, 2011

(51) Int. Cl.
*A63F 9/00* (2006.01)
*A63F 13/02* (2006.01)

(52) U.S. Cl.
CPC ......... *A63F 13/02* (2013.01); *A63F 2300/1043* (2013.01)
USPC .......................................................... 463/38

(58) Field of Classification Search
None
See application file for complete search history.

(56) References Cited

U.S. PATENT DOCUMENTS

| | | | | |
|---|---|---|---|---|
| 5,213,327 A | * | 5/1993 | Kitaue | 463/38 |
| 5,645,277 A | * | 7/1997 | Cheng | 273/148 B |
| 5,883,690 A | * | 3/1999 | Meyers et al. | 345/161 |
| 6,672,962 B1 | * | 1/2004 | Ozaki et al. | 463/37 |
| 6,811,491 B1 | * | 11/2004 | Levenberg et al. | 463/47 |
| D500,319 S | * | 12/2004 | Wada | D14/401 |
| 6,933,861 B2 | * | 8/2005 | Wang | 341/20 |
| D583,875 S | * | 12/2008 | Roberts | D21/324 |
| D589,567 S | * | 3/2009 | Roberts | D21/324 |
| D590,893 S | * | 4/2009 | Roberts | D21/324 |
| 7,833,097 B1 | * | 11/2010 | Maddox et al. | 463/36 |
| 7,927,216 B2 | * | 4/2011 | Ikeda et al. | 463/38 |
| 7,931,535 B2 | * | 4/2011 | Ikeda et al. | 463/38 |
| 7,942,745 B2 | * | 5/2011 | Ikeda et al. | 463/38 |
| 2003/0052860 A1 | * | 3/2003 | Park et al. | 345/156 |
| 2006/0258452 A1 | * | 11/2006 | Hsu | 463/36 |
| 2007/0021210 A1 | * | 1/2007 | Tachibana | 463/37 |
| 2007/0052177 A1 | * | 3/2007 | Ikeda et al. | 273/317 |
| 2007/0060391 A1 | * | 3/2007 | Ikeda et al. | 463/46 |
| 2007/0066394 A1 | * | 3/2007 | Ikeda et al. | 463/37 |
| 2008/0015017 A1 | * | 1/2008 | Ashida et al. | 463/37 |
| 2010/0279771 A1 | * | 11/2010 | Block et al. | 463/37 |

OTHER PUBLICATIONS

XS Games, Pop Star Guitar With Two Grips, Release Date: Nov. 18, 2008.

* cited by examiner

*Primary Examiner* — Seng H Lim
(74) *Attorney, Agent, or Firm* — Sheppard Mullin Richter & Hampton LLP

(57) ABSTRACT

According to various embodiments of the invention an adapter apparatus is provided that is combinable with a computer or video game controller. In accordance with one embodiment, the adapter apparatus is a controller adapter, comprising: a housing configured to attach to a controller having a controller input, wherein the housing at least partially covers the controller input when the housing is attached to the controller, the housing comprising: a holding mechanism configured to secure the housing to the controller when the housing is attached to the controller; an adapter input disposed on an exterior surface of the housing opposite the controller input; and a translation element positioned between the adapter input and the controller input such that a user input to the adapter input translates to a corresponding user input to the controller input.

21 Claims, 6 Drawing Sheets

ADAPTER APPARATUS FOR A HANDHELD CONTROLLER

FIELD OF THE INVENTION

The present invention relates to game controllers, and more particularly, some embodiments relate to an adapter apparatus for a computer or video game controller.

DESCRIPTION OF THE RELATED ART

Modern interactive software programs, such as video games and the like, typically allow the user (e.g., a player of a video game) to provide some form of input through a device. For example, for today's typical desktop or laptop computer, the popular form of user input is through a keyboard and mouse. Within the realm of video games, the preferred form of input is through use of a game controller of one form or another, which controller can take many shapes and forms. In one example, a controller might be a handheld controller that has input features such as a plurality of buttons, analog joysticks, a D-pad directional control and other user input devices that provide a means for a gamer (i.e. video game player) to input desired control commands to the video game software. In turn, the inputted control commands would typically affect the game activity on the video screen.

For example, a typical controller for a Sony® PlayStation®, Microsoft® XBOX®, XBOX 360®, or Nintendo® Wii® gaming console is typically connected to the gaming console through a wire or wirelessly and comprises multiple buttons (for example X, O, Δ, □ or X, A, B, Y buttons, trigger buttons) and directional inputs (e.g., analog joysticks, four-way D-Pads). Likewise, handheld and mobile gaming systems, such as the Nintendo® DS™, Nintendo DS Lite™, and Sony® PSP®, have similar such controllers built-in, having buttons (e.g., X, O, Δ, □ or X, A, B, Y buttons) and directional inputs (e.g., D-Pads) that are usually integrated into the chassis of the system for purposes of size and mobility. Such buttons and directional inputs on the Nintendo® DS™ and Sony® PSP® (and other similar handheld video game systems) constitute types of video game controllers.

Additionally, a controller for a gaming console or computer might take on many diverse forms. A controller might be configured as a joystick as is popular for flight simulator games, a steering wheel and pedal combination as is popular for driving games, and guitar or other musical instruments for interactive music-based games. These types of controllers are readily available for both gaming consoles and computers. However, such controllers typically are standalone controllers, which are individually equipped with their own electronic implementation and input/output interface to the computer or video game system. Because each controller individually requires its own electronic components, the cost of purchasing individual controllers can be an expensive venture, especially when purchasing a variety of controllers in different forms.

For example, a video game system running a driving game may be operated using the system's standard controller (e.g., a controller with a directional pad and X, A, B, Y buttons) but, optionally, can also be operated using a steering wheel to enhance the experience of the game. Typically, the steering wheel controller would be a controller separate from the system's standard controller and implemented with its own electronic implementation. However, in some situations, it would be more convenient and less expensive if an existing controller, such as the system's standard controller, could be reconfigured to be more suitable for the type of game being played, or reconfigured to meet the preferences of the user operating the controller.

BRIEF SUMMARY OF EMBODIMENTS OF THE INVENTION

According to various embodiments of the invention a controller adapter apparatus is provided and, more specifically, for some embodiments an adapter apparatus is provided that is combinable with a computer or video game controller.

In one embodiment, a controller adapter is provided, comprising: a housing configured to attach to a controller having a controller input, wherein the housing at least partially covers the controller input when the housing is attached (Or mated) to the controller, the housing comprising: a means for holding the housing to the controller when the housing is attached to the controller; and a means for accepting input from a user, wherein the means for accepting input is disposed on an exterior surface of the housing opposite the controller input; and a means for translating input from the means for accepting input to corresponding input to the controller input. In some such embodiments, the housing may further comprise a means for accepting the controller when the housing is attached to the controller, wherein the means for accepting the controller at least partially covers the controller input.

For example, the controller adapter may comprise a housing configured to attach to a controller having a controller input, wherein the housing at least partially covers the controller input when the housing is attached to the controller, the housing comprising: a holding mechanism (e.g., a latch) configured to secure the housing to the controller when the housing is attached to the controller; an adapter input disposed on an exterior surface of the housing opposite the controller input; and a translation element positioned between the adapter input and the controller input such that a user input to the adapter input translates to a corresponding user input to the controller input. The translation element may be made of elastomer or mechanical components, such as resilient elements (e.g., springs). The housing may further comprise a cavity configured to accept the controller and at least partially cover the controller input when the housing is attached to the controller. In doing so, a controller may be placed into the cavity of such a controller adapter such that at least one entire surface of the controller is covered by the adapter by the cavity surface. Depending on the controller, the surface of the controller may include controller inputs (e.g., buttons, switches, directional pads, joysticks), outputs (e.g., lights, sound), or both. Additionally, the controller may be a wired or wireless controller for a game system, or a controller integrated into a handheld game system, such as a Nintendo® DS™, Nintendo DS Lite™, or Sony® PSP®.

In further embodiments, the controller input or the adapter input may be a button, directional pad (i.e., D-pad), or joystick. For example, a controller adapter in accordance with an embodiment may have a directional pad that maps button pushes of the adapter's directional pad to the directional pad of a controller that is attached to the adapter. Alternatively, in another example, a controller adapter in accordance with an embodiment may have a directional pad that maps button depresses of the adapter's directional pad to several individual buttons of a controller that is attached to the adapter. Similarly, some embodiments may have switches on the adapter that map to either switches or buttons of the controller to which the adapter is attached.

In other embodiments, the housing of the controller adapter may further comprise a surface that allows light to pass through the surface. For example, a controller adapter in accordance with an embodiment may be configured with a covering, such as a plastic window, that allows infrared light from a controller to pass through the adapter to which the controller is attached. Such an example embodiment would allow a controller equipped with an infrared light emitter to be attached to the controller adapter and still be able to transmit an infrared light signal through the adapter via the covering.

Additionally, an embodiment may further comprise a surface that allows light from a display on the controller light to pass through the surface. For example, the light from the display may pass through the surface through a plastic window, or simply through an aperture in the surface. In doing so, the controller adapter may be attached to a controller while allowing full or partial visibility of the display. For example, an embodiment may be appropriately configured to attach to a controller integrated into a handheld game system (e.g., Nintendo® DS™, Nintendo DS Lite™, Sony® PSP®), while leaving the display of the handheld game system (e.g., liquid crystal display, organic light emitting diode display) partially or completely un-obscured from visibility.

In further embodiments, the holding mechanism of the controller adapter comprises a resilient element that ensures that the holding mechanism securely attaches to a controller. For example, a controller adapter in accordance with an embodiment may be configured with a holding mechanism equipped with a spring element such that the holding mechanism remains held when the adapter is attached to a controller, but easily released when a user wants to free the controller from the adapter.

In other embodiments, the housing of the controller adapter may further comprise a surface configured to allow sound to pass through the perforated surface. For example, a controller adapter in accordance with an embodiment may be configured with a perforated surface that allows sound emitted from a controller equipped with a speaker to pass through the adapter.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

The present invention is directed toward accessories and attachments for handheld electronic devices such as, for example, computer or video game controllers.

Before describing the invention in detail, it is useful to describe a few example environments with which the invention can be implemented. One such example is that of a game console system used by one or more video game players (gamers).

Figure 1:
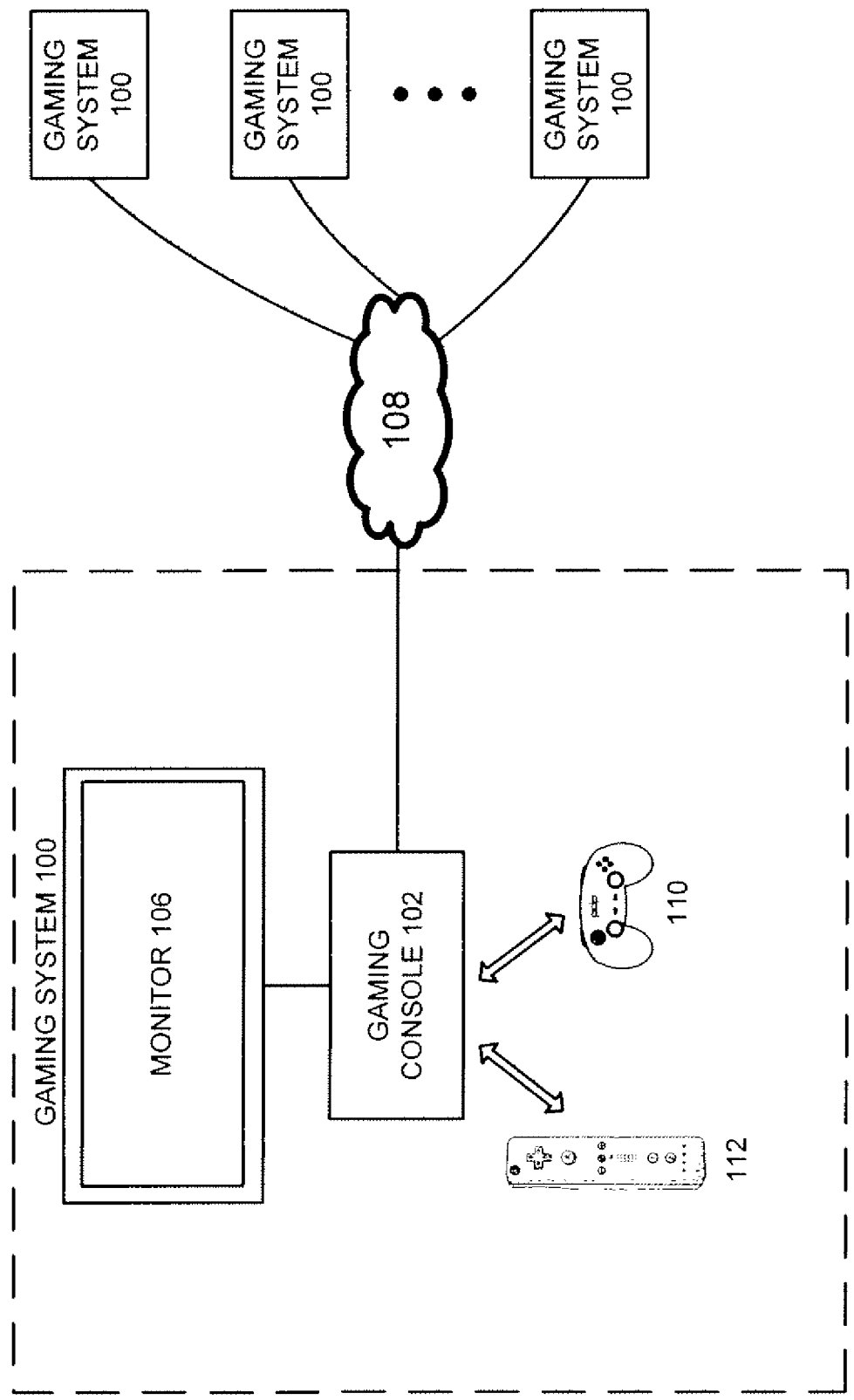
FIG. 1 is a diagram illustrating one example environment in which an embodiment of the invention can be implemented.

FIG. 1 is a block diagram illustrating a generalized version of a gaming system 100 as one example of an environment with which the invention can be implemented. Referring now to FIG. 1, the example gaming system includes a gaming console 102, a monitor 106, a first type of game controller 110, and a second type of game controller 112. The first and second types of game controllers (110 and 112) in this example are different types of traditional game controllers. The illustrated example also includes an interface to a communication medium or communication network 108 such as, for example, the Internet or other communication channel.

In one environment, gaming console 102 might be implemented as a PlayStation®, Xbox360®, Wii® or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to be displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. In the alternative, a video projector or other viewing mechanism (not shown) can be utilized in place of the monitor 106 to provide similarity display functionality.

In some environments, speakers can also be provided, separately or with monitor 106, to provide audible information to the gamer during game play and during set up. For example, in one embodiment, monitor 106 might be implemented as a television with built in speakers that is connected to the gaming console via a coaxial or other audio and video input.

Also illustrated in the example environment is gaming controller 110 and 112 that can be used to allow gamers to provide input to the game software as well as to receive feedback from the game software during set up and game play. As described in the background section, controller 104 can include, for example, X, Y, A, B buttons, trigger buttons, analog joysticks, key pads, and other devices to allow the user to provide input to the game. Thus by actuating the various buttons, switches or joysticks, the gamer can control the operation of the game or control characters or vehicles in the game. The interface between gaming console 102 and controller 104, dance pad game controller 110, and musical-instrument game controller 112 might be either wired and/or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live™, or other entities or services. Also, through a communication medium 108, gamers might compete amongst other gamers at their gaming systems 100, even if such other gamers at remote or distant locations. Note that depending on the gaming environment, remote gaming systems 100 might or might not have similar configurations to one another.

Although not depicted, game system 100 can have feedback devices, or stimulus, that can be used to provide sensory feedback from the gaming console to the user. The game system 100 can also have biosensors allowing for bioinformation (e.g., biometrics) regarding the user to provided to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing systems. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the gaming controller 104. For example, the communication controller can be equipped with another communication interface and the biosensors, feedback devices, or both are communicatively coupled (whether hard wired or wirelessly) to the gaming controller 104. As one specific example of this case, a biosensor and feedback device can be configured for communicative coupling to a Wii controller via the Wii controller's Wii Nunchuk® pass-through port.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2:
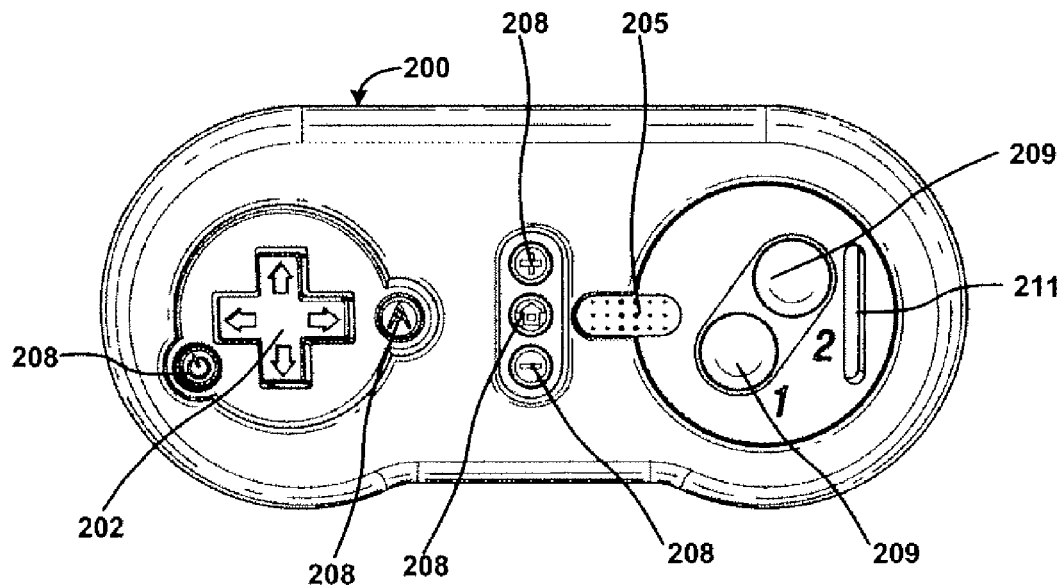
FIG. 2 is a diagram illustrating a top view of an example controller adapter in accordance with an embodiment of the invention.

FIG. 2 illustrates a top view of an example controller adapter 200 in accordance with one embodiment of the invention. The adapter 200 comprises a series of adapter inputs (202, 208, 209), a perforated section 205 configured to better allow sound to pass through the adapter, and a aperture 211 that provides a direct view to visual elements on the controller (e.g., a display or indicator lights on a controller). As illustrated, the adapter input 202 is a directional pad (D-pad) that provides directional user input from the adapter 200 to an attached controller (not shown).

Figure 3:
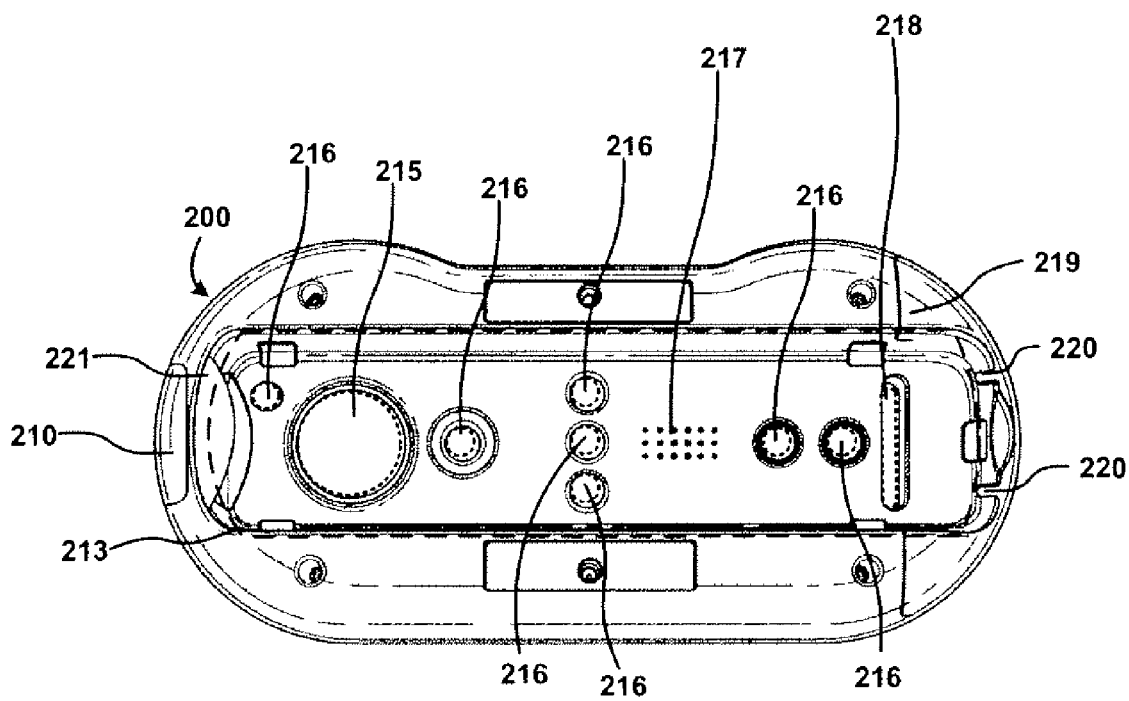
FIG. 3 is a diagram illustrating a bottom view of an example controller adapter in accordance with an embodiment of the invention.

FIG. 3 illustrates a bottom view of the same controller adapter 200 illustrated in FIG. 2. It is shown that the adapter 200 further comprises a cavity 213 (large-dashed line) that serves as the attachment point for a controller. The cavity 213 comprises multiple apertures (215, 216) through which inputs of the controller interface with inputs of the adapter 200. Accordingly, through these apertures 215 and 216, user input made to the adapter 200 through the adapter inputs illustrated in FIG. 1 (i.e., 202, 208, 209) are translated to controller inputs for the controller attached to the adapter 200. The circles having small-dashes indicate the edges of these apertures. The cavity 213 further comprises an aperture that allows a user to view visual output from a controller that is attached. For example, through aperture 218, a user can directly view a display or indicator lights disposed on a controller. The cavity 213 also comprises a perforated surface 217 that enables sound emitted from a controller to pass through the adapter 200 at an audible volume.

As depicted, the housing of adapter 200 is equipped with a window 210 that enables light emitted from a controller to pass through a surface of the adapter 200. For example, for a controller configured with an infrared light emitter and/or detector, the controller once attached to the adapter 200 can readily send and receive light through the window 210. Window 210 can be made of plastic and can be useful for sending and receiving a communication signal to and from a controller when the controller attached to an adapter in accordance with an embodiment of the invention.

Additionally, although not shown, some controller adapters in accordance with an embodiment of the invention are configured with features that allow a controller that is compatible with external accessories, such as feedback devices and biosensors, to remain so even when the controller is attached to the adapter. For example, in one embodiment, the controller adapter has an opening that allows an accessory port on a controller to be accessible when the adapter is attached to the controller.

The housing of the adapter is further equipped with a groove 221 and a holding mechanism 219, which in conjunction secure a controller to adapter 200. The holding mechanism secures a controller to adapter 200 using prongs 220, which are configured such that they interface with pre-existing grooves of the controller. Accordingly, when a controller is attached with adapter 200, the prongs 220 of holding mechanism 219 enter the grooves of the controller and secure it in place. For some embodiments, such a holding mechanism is further equipped with a resilient element, which ensures the holding mechanism 219 remains securely in position when the adapter 200 is attached to a controller. but is easy to release when a user wishes to release the controller from the adapter 200. An example of a holding mechanism configured with a resilient element is illustrated in FIGS. 4A and 4B.

Figure 4A:
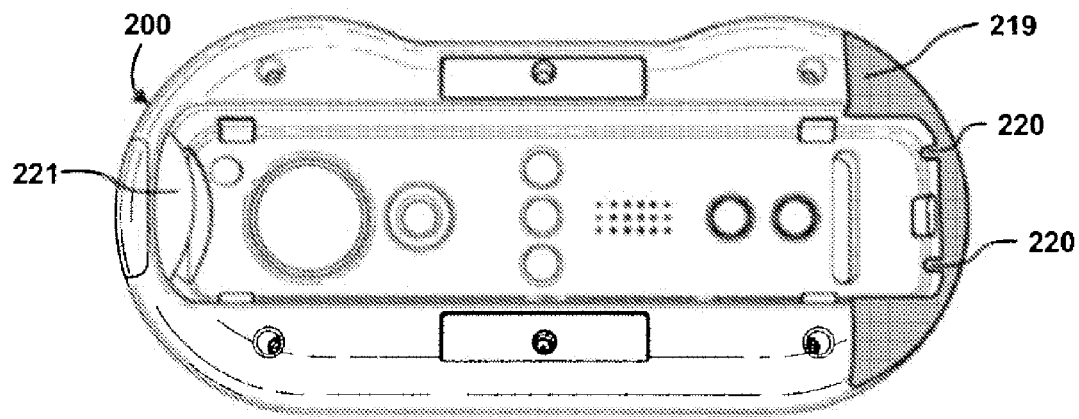
FIGS. 4A and 4B are diagrams illustrating a holding mechanism of an example controller adapter in accordance with an embodiment of the invention.
Figure 4B:
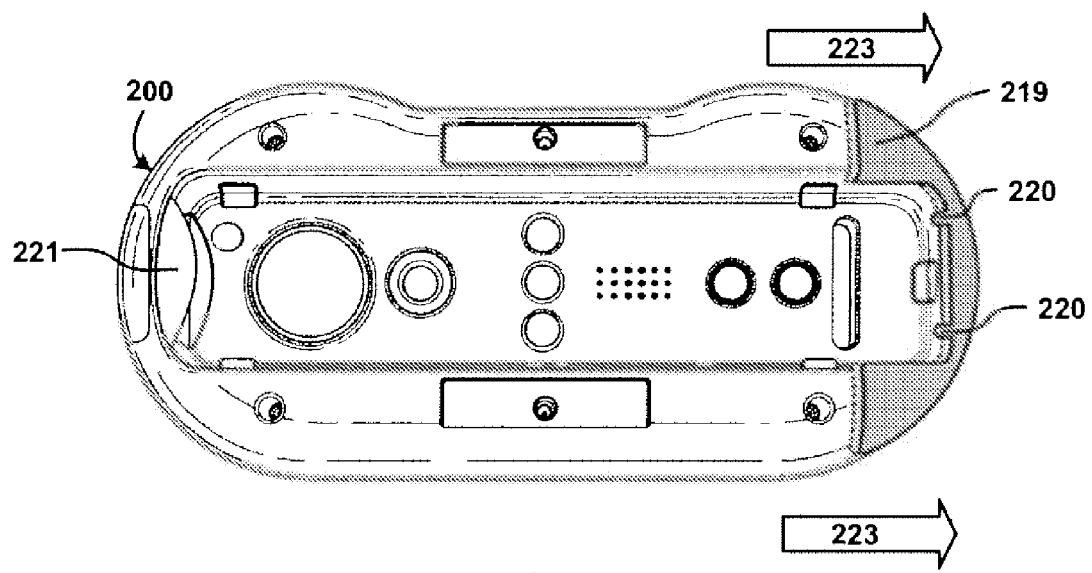

Referring now to FIG. 4A, a diagram is provided of adapter 200 comprising holding mechanism 219, which is marked with dark shading. As noted above, when the holding mechanism 219 is in the resting position as illustrated, the prongs 220 enter corresponding pre-existing grooves in a controller. These prongs 220, in conjunction with groove 221, secure the controller to adapter 200. However, when the controller needs to be detached from the adapter 200, force is exerted against the holding mechanism 219 in direction 223, as illustrated in FIG. 4B. This causes the prongs 220 securing the controller to adapter 200 to withdraw from their respective pre-existing grooves and, in doing so, release the controller from the adapter 200 on the holding mechanism 219 side. With one side of the controller released, the controller can slide out of groove 221 and thereby be free of the adapter 200. Note, in one embodiment, when force (in direction 223) ceases to be exerted against holding mechanism 219, the holding mechanism 219 returns to its resting position.

Figure 5A:
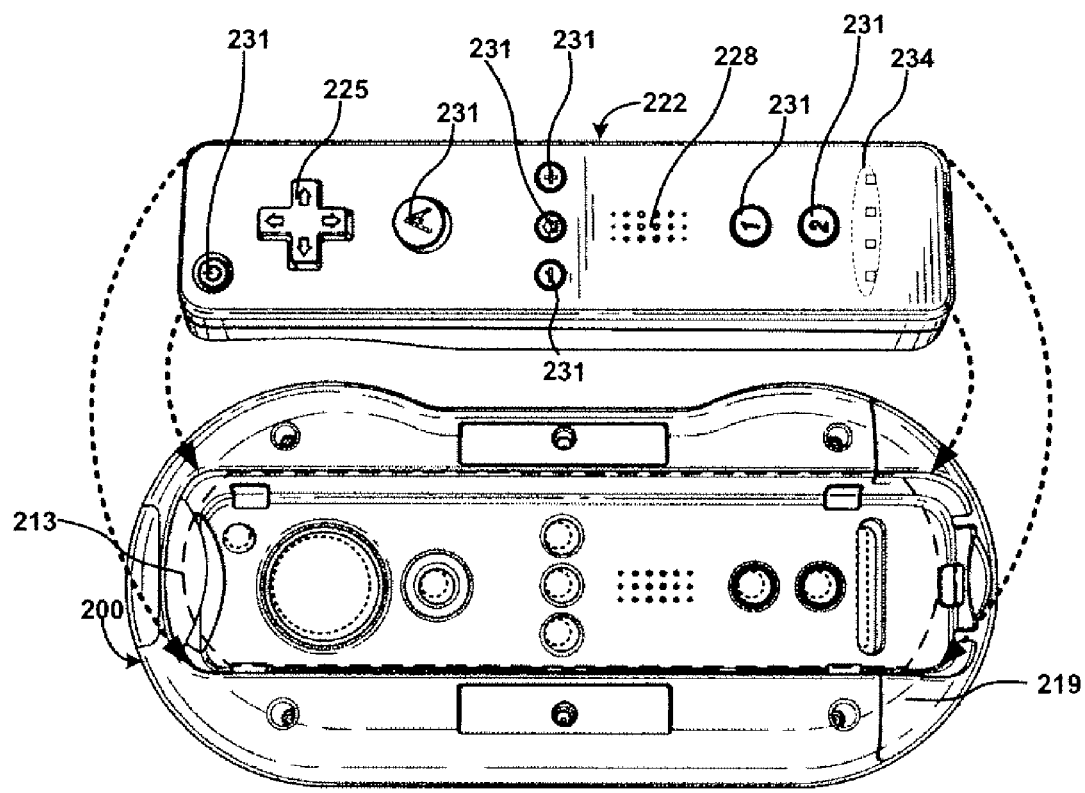
FIGS. 5A and 5B are diagrams illustrating one manner in which an example controller can be attached to an example controller adapter in accordance with an embodiment of the invention.
Figure 5B:
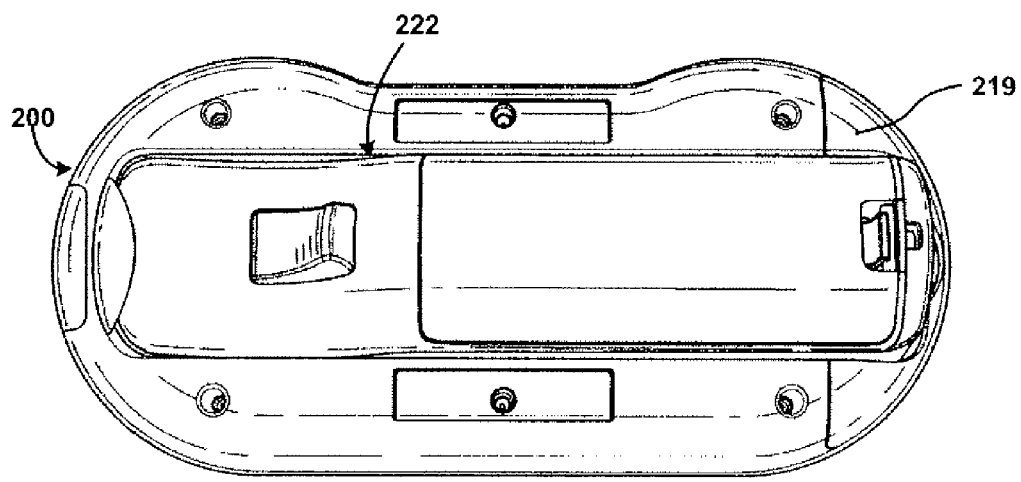

Referring now to FIGS. 5A and 5B, diagrams are provided illustrating one manner in which an example controller 222 can be attached to an example controller adapter 200 in accordance with an embodiment of the invention. The controller 222 is shown to have controller inputs (a direction pad 225 and buttons 231), a speaker 228, and indicator lights 234. As illustrated, the controller 222 can be mated with adapter 200 via cavity 213 (large dash lines). Through the apertures (depicted by the dashed circles), controller inputs (225, 231) can receive inputs from the adapter inputs (e.g., 202, 208, 209 illustrated in FIG. 2).

Various methodologies can be utilized to translate user input from the adapter inputs to user input to the controller inputs. For example, some embodiments may utilize mechanical means, comprising springs and plastic pegs, to translate the user inputs to the adapter to user input to the controller. Such means can be positioned within the adapter housing, between the adapter inputs and apertures that access the user inputs (e.g., 215 and 216 in FIG. 3). Another example includes using a semi-rigid, elastomer structure having embossed features to translate adapter inputs to controller inputs. An example of an elastomer element is illustrated in FIGS. 6A and 6B.

Figure 6A:
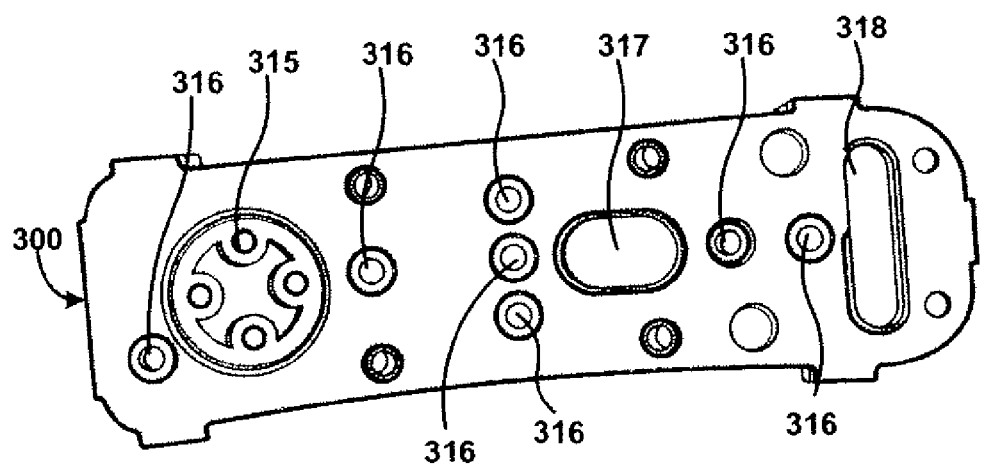
FIGS. 6A and 6B are diagrams illustrating an example translation element that can be used in a controller adapter in accordance with one embodiment of the invention.
Figure 6B:
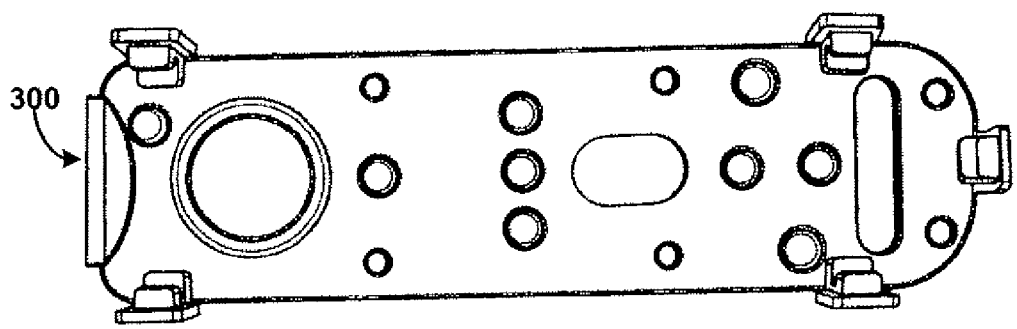

FIG. 6A illustrates a top view of an example elastomer element 300 used as a translation element in accordance with embodiment of the invention. FIG. 6B provides a bottom view of the same elastomer element 300. The elastomer element 300 is configured with embossed features on both sides of the element 300, such that force is exerted on a feature from one side of the element 300 causes a corresponding embossed feature on the opposite side of the element 300 to protrude. In this way, element 300 can translate one depression of an embossed feature (e.g., 316, 317) into one depression of one or more controller inputs. As shown, the element 300 includes a feature 315 for a directional pad, and features 316 for buttons. In addition, the element is configured with an aperture 317 to allow sound to pass from the controller through the adapter, and an aperture 318 to allow direct viewing of a display or indicator lights residing on the surface of the controller.

Figure 7A:
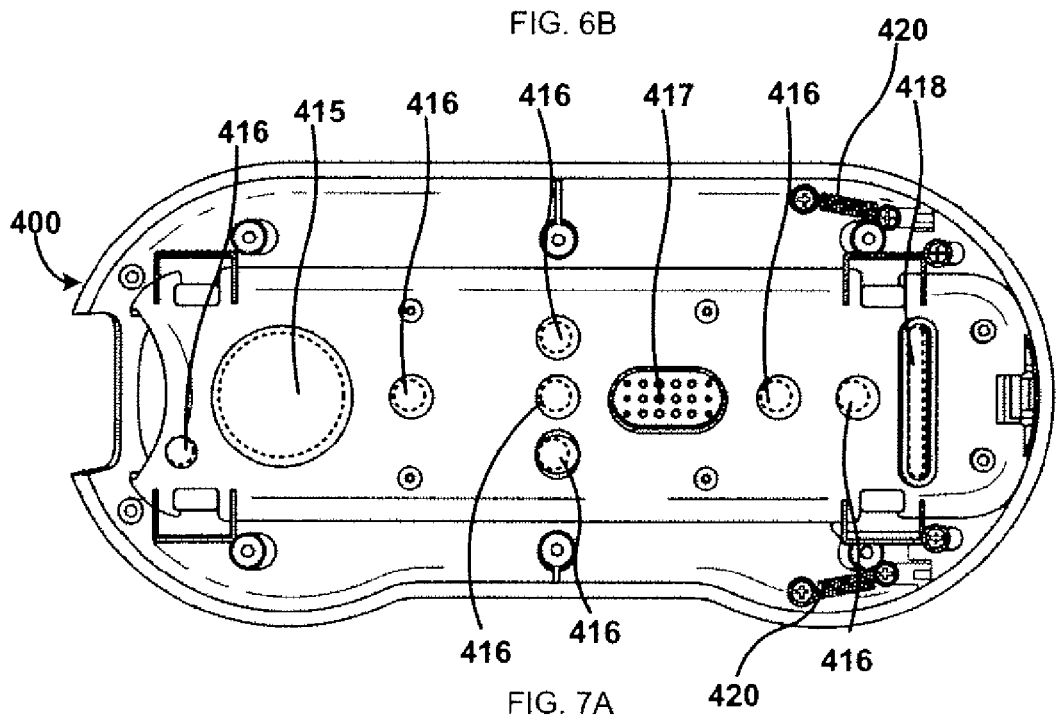
FIGS. 7A-7C are diagrams illustrating an example construction for a controller adapter in accordance with an embodiment of the invention.
Figure 7B:
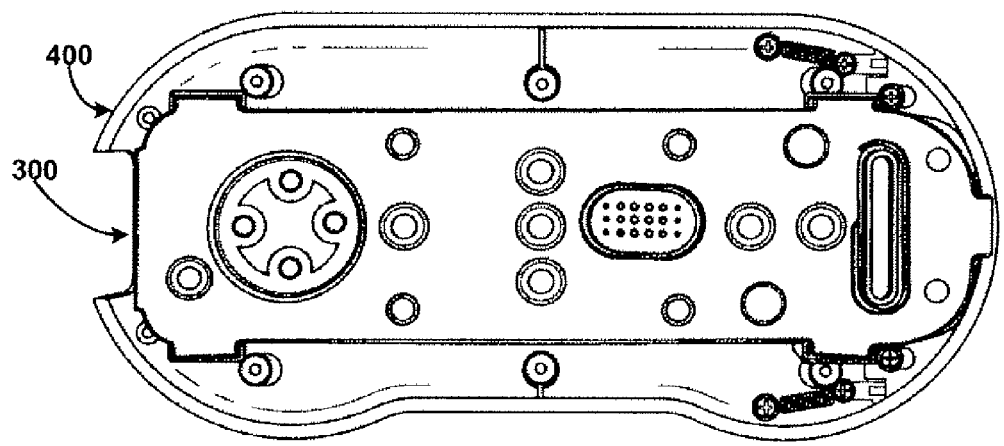

Turning now to FIGS. 7A and 7B, the diagrams provided illustrate an example construction for a controller adapter in accordance with an embodiment of the invention. Specifically, FIG. 7A starts with the bottom half 400 of the housing of a controller adapter. The depicted half 400 comprises multiple apertures (415 for the directional pad and 416 for the buttons) through which adapter inputs are translated to controller inputs for a controller attached to the adapter. The half 400 further comprises a perforated surface 417 to enable sound emitted from a controller to pass through the adapter, and an aperture 418 that enables direct viewing of a display or indicator light on an attached controller. Also depicted are tension springs 420, which serve as resilient elements for a holding mechanism such as that illustrated in FIGS. 4A and 4B (i.e., holding mechanism 219). Some embodiments may utilize elastic bands or compression springs as resilient elements for the holding mechanism. One of ordinary skill in the art, after reading the invention described herein, will appreciate that further alternative resilient elements can be used in accordance with an embodiment of the invention.

Figure 7C:
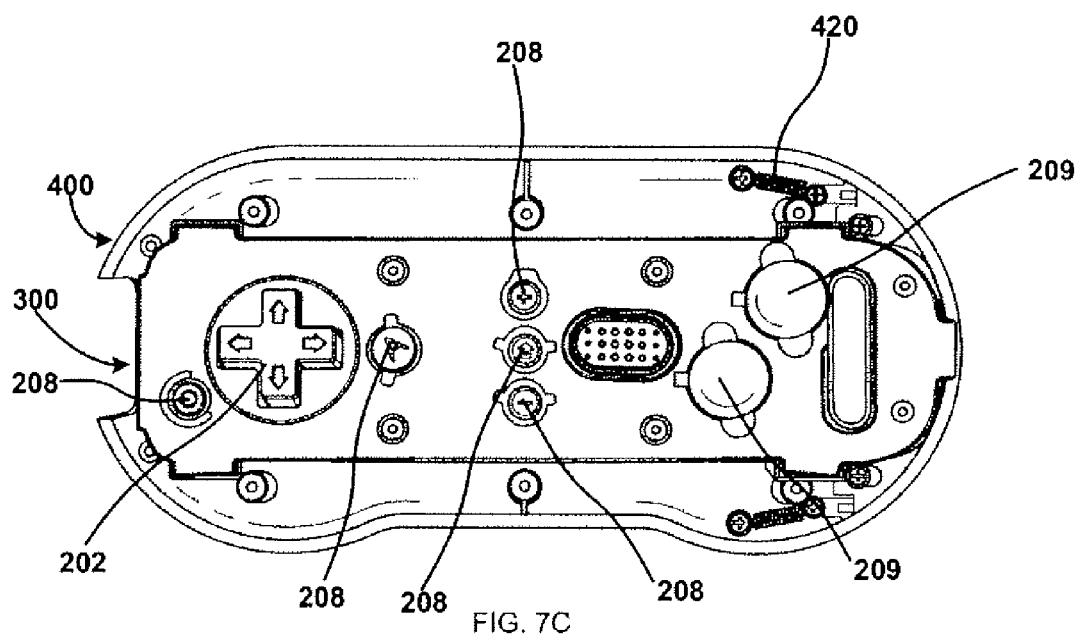

FIG. 7B illustrates how the elastomer element 300 can be placed over the apertures (415 and 416) and functions as a translation element in accordance with an embodiment of the invention. Element 300 translates a depression of an adapter input into one or more controller inputs. FIG. 7C depicts how adapter inputs 202 (directional pad), 208, and 209 (various buttons) are positioned and placed over the one or more embossed features on element 300 that correspond to that particular adapter input's translation (to the controller input). Depending on the embodiment, these adapter inputs may be individual pieces that are placed onto element 300, or may be constructed as a part of element 300. For the embodiments where the adapter inputs are constructed as individual pieces, the adapter inputs may be rigid and constructed of plastic. Additionally, in some embodiments, the adapter input pieces may be constructed such that they translates inline adapter input into offset controller input. For example, where an adapter input is a button, an adapter button may be configured and constructed such that its depression translates to a depression of a controller button offset with respect to the adapter button.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like: the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A controller adapter, comprising:
    a housing configured to be releasably attached to a controller having controller input, wherein the housing at least partially covers the controller input when the housing is attached to the controller, the housing comprising a first portion and a second portion, wherein the first portion of the housing is movable relative to the second portion of the housing in response to an outside force;
    a resilient element coupled to the first and second portions of the housing and configured to exert a force sufficient to cause the first and second housing portions to be maintained in a first position in proximal relation to one another to thereby releasably secure the controller to the housing, and also configured to allow the first portion to be moved relative to the second portion to an open position upon the application of the outside force sufficient to overcome the force exerted by the resilient member, wherein the force exerted by the resilient member is sufficient to return the first and second housing portions to the first position upon removal of the outside force, and wherein when in the dosed position the housing retains a controller attached thereto and when in the open position the housing permits the controller to be detached from the housing;
    an adapter input disposed in proximal relation to the housing and protruding from an exterior surface of the housing; and
    a translation element positioned between the adapter input and the controller input such that a user actuation of the adapter input causes actuation of a corresponding controller input.

2. The controller adapter of claim 1, wherein the housing further comprises a cavity configured to accept the controller and at least partially cover the controller input when the housing is attached to the controller.

3. The controller adapter of claim 1, wherein the controller input or the adapter input is a button, directional pad, switch, or joystick.

4. The controller adapter of claim 1, wherein the housing further comprises a surface that allows a signal to pass through the surface.

5. The controller adapter of claim 1, wherein the housing further comprises a surface that allows light to pass through the surface.

6. The controller adapter of claim 5, wherein the light is an infrared light.

7. The controller adapter of claim 5, wherein the light is from a display on the controller.

8. The controller adapter of claim 1, wherein the housing further comprises a surface configured to allow sound to pass through the surface.

9. The controller adapter of claim 1, wherein the controller comprises a handheld game system.

10. The controller adapter of claim 1, wherein the controller is a wired controller or wireless controller for a game system.

11. A controller adapter, comprising:
    a housing configured to attach to a controller having a controller input, wherein the housing at least partially covers the controller input when the housing is attached to the controller, the housing comprising a first portion and a second portion, wherein the first portion of the housing is movable relative to the second portion of the housing in response to an outside force;
    means for exerting a force sufficient to cause the first and second housing portions to be maintained in a first position in proximal relation to one another to thereby releasably secure the controller to the housing, and for allowing the first portion to he moved relative to the second portion to an open position upon the application of the outside force sufficient to overcome the force exerted by the resilient member, wherein the force exerted by the resilient member is sufficient to return the first and second housing portions to the first position upon removal of the outside force, and wherein when in the closed position the housing retains a controller attached thereto and when in the open position the housing permits the controller to be detached from the housing;

means for accepting input from a user, wherein the means for accepting input is disposed on an exterior surface of the housing opposite the controller input; and means for translating input from the means for accepting input to corresponding input to the controller input.

12. The controller adapter of claim 11, wherein the housing further comprises a means for accepting the controller when the housing is attached to the controller, wherein the means for accepting the controller at least partially covers the controller input.

13. The controller adapter of claim 11, wherein the means for accepting adapter input provides directional input or a toggle input.

14. The controller adapter of claim 11, wherein the housing further comprises a means for allowing a signal to pass through the controller adapter.

15. The controller adapter of claim 11, wherein the housing further comprises a means for allowing light to pass through the controller adapter.

16. The controller adapter of claim 15, wherein the means for allowing light to pass through the controller adapter allows light from a display on the controller.

17. The controller adapter of claim 11, wherein the housing further comprises a means for allowing sound to pass through the controller adapter.

18. The controller adapter of claim 11. wherein the controller comprises a handheld game system.

19. The controller adapter of claim 11 wherein the controller is a wired controller or wireless controller for a game system.

20. The controller adapter of claim 1, wherein the adapter input is configured to translate adapter input motion in a first axis to controller input in a second axis.

21. The controller adapter of claim 1, wherein the translation element comprises an elastomeric structure with embossed features, wherein a force exerted by an adapter input on an embossed feature on a first side of the translation element causes a corresponding feature on a second side of the translation element to exert a force on a corresponding controller input.

* * * * *